United States Patent [19]
LaSpisa et al.

[11] 3,807,277
[45] Apr. 30, 1974

[54] FLUID ACTUATED CONTROL SYSTEM

[75] Inventors: Ronald J. LaSpisa, North Tonowanda; Gary W. Woods, Rensselaer, both of N.Y.

[73] Assignee: The United States of America as represented by the Secretary of the Army, Washington, D.C.

[22] Filed: Apr. 7, 1972

[21] Appl. No.: 242,005

[52] U.S. Cl............................ 91/3, 91/388, 91/390
[51] Int. Cl............................................. F15b 13/16
[58] Field of Search............... 91/3, 375 R, 390, 388

[56] References Cited
UNITED STATES PATENTS

| | | | |
|---|---|---|---|
| 3,125,002 | 3/1964 | McCombs, Jr. | 91/375 |
| 3,417,667 | 12/1968 | Ikebe et al. | 91/375 |
| 3,515,030 | 6/1970 | Boothe | 91/3 |
| 3,648,564 | 3/1972 | Burton | 91/3 |
| 3,461,777 | 8/1969 | Spencer | 91/388 |
| 3,494,257 | 2/1970 | Welk, Jr. et al. | 91/388 |

FOREIGN PATENTS OR APPLICATIONS

| | | | |
|---|---|---|---|
| 2,013,589 | 3/1970 | Germany | 91/388 |

*Primary Examiner*—Paul E. Maslousky
*Attorney, Agent, or Firm*—Edward J. Kelly; Herbert Berl; Albert E. Arnold, Jr.

[57] ABSTRACT

A rotatable shaft restrained from axial displacement is maintained at a pre-selected angular position by a fluid actuated control system comprising a sensing device disposed for sensing angular displacement of the shaft from the pre-selected position. The sensing device generates signals proportional to the displacement sensed and transmits them to a proportional fluidic amplifier which divides a controlled fluid flow proportional to the signals and directs the proportionally divided flows to opposite ends of a cylinder thereby actuating a piston for linear displacement therein proportional to the angular displacement of the shaft. A motion converting device converts linear displacement of the piston to angular displacement of the shaft.

5 Claims, 5 Drawing Figures

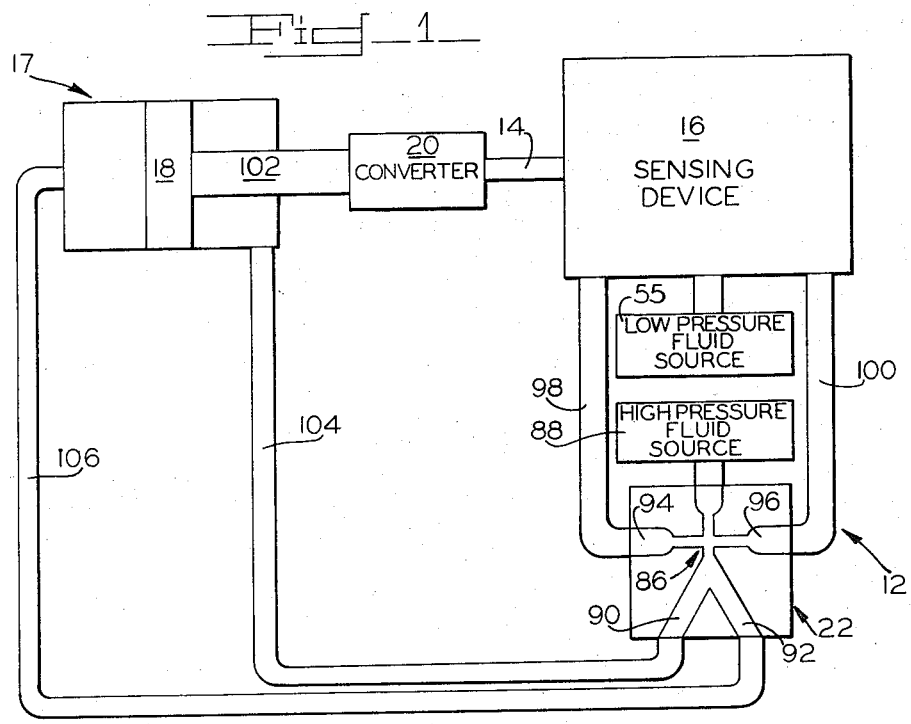
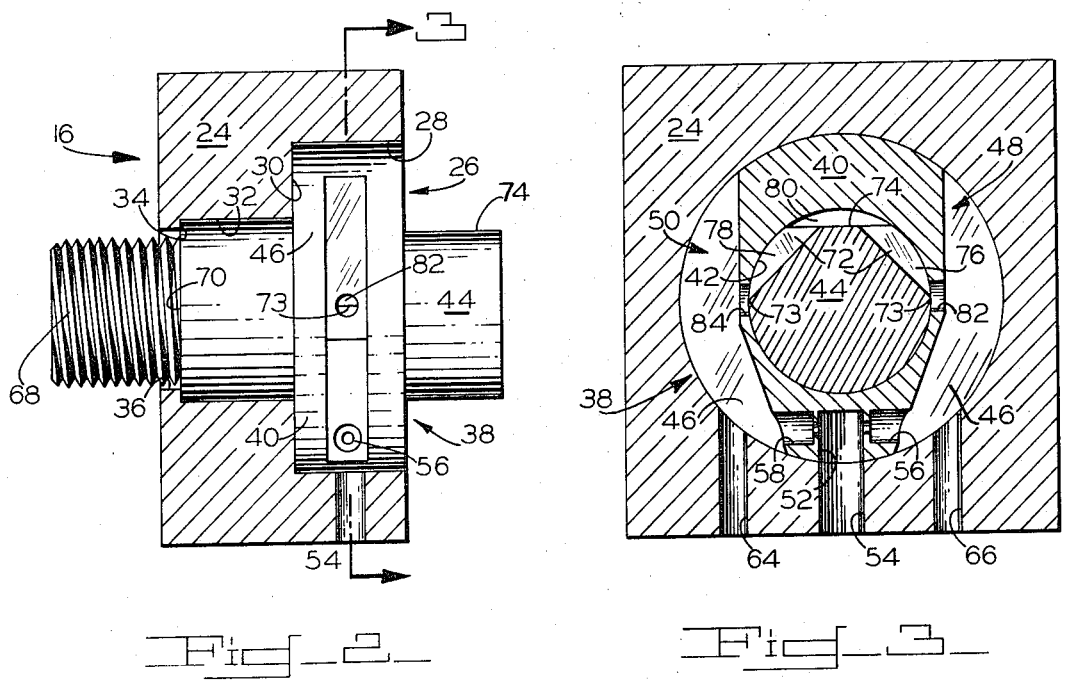

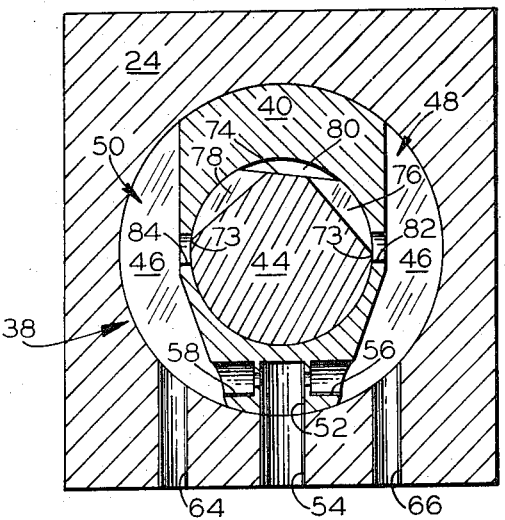
Fig_4_
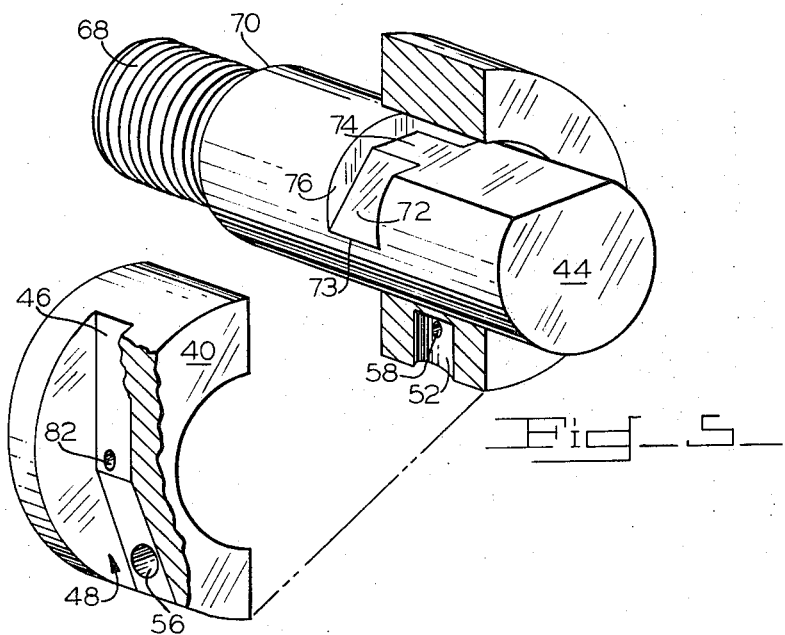
Fig_5_

3,807,277

FLUID ACTUATED CONTROL SYSTEM

The invention described herein may be manufactured, used and licensed by or for the Government for governmental purposes without the payment to us of any royalty thereon.

BACKGROUND OF THE INVENTION

This invention relates to fluid actuated control systems whereby movement of a fluid responsive device is effected by an amplified fluidic signal transmitted thereto, and it pertains more particularly to a sensing device which sense angular displacement of a rotational shaft and responsive thereto generates and transmits a fluid signal to a fluidic system to effect a corresponding displacement of the fluid responsive device.

Recent developments in fluidic techniques have made available to ordnance designers, for instance, controls which are much more reliable than those previously available and which are affected less by those adverse conditions that decrease the reliability and accuracy of ordnance weapons. Because fluidic systems require very few moving parts their reliability is consequently increased over other known systems. They, too, are affected only slightly by extreme temperatures and temperature changes, and by sudden shocks and periods of vibration to which ordnance weapons are subjected when discharged. They also provide quick responses to signals, which add to their worth in the field of ordnance design as well as in other fields where similar conditions exist.

SUMMARY OF THE INVENTION

It is a principal object of this invention to provide a fluid responsive control system wherein angular displacement of a rotatable shaft is sensed and signals relative to the displacement are generated, amplified and transmitted to a fluid responsive device for relative displacement thereof.

It is another object of this invention to provide a fluid actuated control system wherein angular displacement of a rotatable shaft is sensed and signals proportional to the displacement are generated, amplified and transmitted to a fluid responsive device for proportional displacement thereof to correct the angular displacement of the shaft.

It is still another object of this invention to provide a fluid actuated control system wherein small angular displacements of a rotatable shaft are sensed and signals proportional to the displacement are generated, amplified and transmitted to a fluid responsive device for proportional displacement thereof to correct the angular displacement of the shaft and wherein saturated signals are generated, amplified and transmitted to the fluid responsive device responsive to greater angular displacements of the shaft.

It is a further object of this invention to provide a simple, rugged and reliable device for sensing angular displacement of a rotatable shaft, and transmitting to a fluid amplifier signals relative to the angular displacement.

In the selected embodiment illustrating the invention the control system is responsive to angular displacement of a rotatable shaft which is fixed against axial displacement and comprises a sensing device having a rotor which is connected to the shaft for angular displacement thereby. A fluid actuated piston is connected to the shaft also through any means well known in the art for converting linear displacement of the piston to angular displacement of the shaft. The sensing device senses angular displacement of the shaft through the rotor and is arranged to generate signals, relative to the displacement, to the input legs of a fluidic amplifier whereby fluid pressure of greater magnitude is transmitted to opposite sides of the piston for displacement thereof so as to angularly displace the shaft back to its original angular position.

The specific nature of the invention as well as other aspects and advantages thereof will clearly appear from the following description of a preferred embodiment which is illustrated in the attached drawings.

BRIEF DESCRIPTION OF THE DRAWINGS

FIG. 1 is a schematic view of the control system;

FIG. 2 is a partial longitudinally cross-sectioned view of the sensing device;

FIG. 3 is a section taken along line 3—3 of FIG. 2 with the rotor shown in a pre-selected position whereby balanced signals are transmitted by the sensing device to the fluidic amplifier;

FIG. 4 is a view similar to FIG. 3 but showing the rotor displaced angularly from the pre-selected position whereby an unbalanced, proportional signal is transmitted to the fluidic amplifier; and FIG. 5 is an isometric, partially fragmented view of the sensing device exclusive of the housing.

DESCRIPTION OF A PREFERRED EMBODIMENT

Shown in the drawings is a fluid actuated control system 12 which is responsive to angular displacement of a rotatable shaft which is restrained from axial displacement. Control system 12 comprises a sensing device 16 connected to shaft 14 so as to be rotationally responsive to angular displacement thereof, a cylinder 17 provided with a piston 18 axially displaceable therein responsive to fluid pressure applied thereagainst, and conventional means 20 for converting axial displacement of the piston to angular displacement of a cylindrical rotor 44 in the sensing device. A fluidic amplifier 22 is operationally disposed between sensing device 16 and cylinder 17 and functions to transmit a pressurized controlled fluid flow thereto for axial displacement of piston 18 responsive to fluidic signals generated by the sensing device.

Sensing device 16 comprises a housing 24 having a stepped bore 26 therethrough including a first section 28 extending from one end of the housing to a first shoulder 30, a second section 32 of smaller diameter extending from the first shoulder to a second shoulder 34 and a reduced diameter section 36 extending from the second shoulder to the opposite end of the housing.

Housing 24 accommodates a sensor 38 which includes a cylindrical sleeve or bushing 40 with an axially disposed cylindrical hole 42 and rotor 44 which is rotationally disposed therein. Sleeve 40 is pressed into first bore 28 so as to be retained against displacement therein and is axially positioned in housing 24 by contact with first shoulder 30, as shown in FIG. 2. A pair of segmental slots 46 are symmetrically formed in sleeve 40 from the outside circumference thereof, as shown in FIG. 3. Slots 46 are closed by the circumferential surface of first section 28 of bore 26 to define a right chamber 48 and a left chamber 50.

A bottomed hole 52 extends radially from the circumference of sleeve 40 equidistant from the bottom ends of right chamber 48 and left chamber 50 and such hole has registry with a passage 54 in housing 24. Such passage 54 has communication with a source 55 which provides a low pressure fluid flow, at approximately 5-7 psi, to hole 52. Fluid communication between hole 52 and chambers 48 and 50 is provided by restrictive orifices 56 and 58, respectively, which are disposed 180° apart with the axes thereof normal to the axis of the hole. A first outlet 64 extends from the outside of housing 24 to first section 28 so as to have fluid communication with left chamber 50 and a second outlet 66 extends similarly into the housing for fluid communication with right chamber 48, for a purpose to be explained hereinafter.

Rotor 44 is provided at one end with a threaded section 68 which makes threaded engagement with shaft 14 so that the rotor is rotatable thereby. Threaded section 68, as shown in FIG. 2, terminates in a shoulder 70 which, when in contact with second shoulder 34, locates rotor 44 axially in sleeve 40.

Provided in the section of rotor 44 which is encircled by sleeve 40 is a pair of similar segmental channels 72 which are oppositely and symmetrically disposed in such section and which are angularly related to each other with bottom end edges 73 thereof diametrically disposed. The upper ends of channels 72 are interrupted by a segmental cut 74 which extends along rotor 44 from the sides of the channels nearest section 68 to the opposite end of the rotor. Channels 72 are partially closed by the circumferential surface of hole 42 to define thereat a right passage 76 and a left passage 78. Both passages 76 and 78 have fluid communication with opening 80 which is defined by segmental cut 74 and the circumferential surface of hole 42, as shown in FIGS. 3 and 4. Fluid communication between right passage 76 and bore 42 is provided by an aperture 82 and a similar aperture 84 provides fluid communication between left passage 78 and such bore. Apertures 82 and 84 are disposed 180° apart so that both may be simultaneously bisected by the respective end edges 73 when rotor 44 is angularly disposed in balanced relation to sleeve 40 at a pre-selected angular position, as shown in FIG. 3.

Thus, when the low pressure fluid flow from source 55 is permitted to pass into hole 52 it passes therefrom equally through right orifice 56 into right chamber 48 and through left orifice 58 into left chamber 50. From chambers 48 and 50 the fluid passes as two signal flows through outlets 66 and 64, respectively, and also through the respective apertures 82 and 84, as controlled by the angular position of rotor 44, to the corresponding passages 76 and 78 and therefrom through opening 80 to the ambient atmosphere. Consequently, the pressure and volume of the signal flows passing through outlets 64 and 66 are controlled by the amount of the fluid flow vented through apertures 82 and 84 from chambers 48 and 50, respectively, to thereby generate and transmit to outlets 64 and 66 fluid signals relative to the angular position of rotor 44. When rotor 44 is rotated to where edges 73 divide apertures 82 and 84 equally, as shown in FIG. 3, the pressures and the volumes of the signal flows through outlets 64 and 66 are the same. When rotor 44 is rotated, as shown in FIG. 4, to an angular position, whereby the opening between left aperture 84 and left passage 78 is consequently decreased, the amount of the signal flow passing through first outlet 64 is proportionally greater than that passing through second outlet 66 thereby producing a proportional signal, transmitted through such outlets, which indicates the angular position of rotor 44 respective to the pre-selected angular position. The degree of angular displacement of rotor 44 which will produce a proportional signal is determined by size of apertures 82 and 84, i.e., the greater the size of these apertures the greater is the angular displacement of the rotor which produces a proportional signal. When, through greater angular displacement of rotor 44, one of the apertures 82 or 84 is closed and the other is fully open, a saturated signal is produced and transmitted to fluidic amplifier 22.

Fluidic amplifier 22 is of conventional type well known in the art and comprises a junction 86 to which a controlled fluid flow at approximately 30 psi is conducted from a source 88. Two branches, including a left passage 90 and a right passage 92, extend from junction 86 in a "Y" configuration so that the controlled fluid may be directed at such junction into either passage with practically no loss in momentum. Proportional deviation of the controlled fluid flow into passages 90 and 92 is controlled by the signal flows which are conducted from outlets 64 and 66 to ducts 94 and 96, respectively, by conduits 98 and 100. Ducts 94 and 96 are located in the same plane as passages 90 and 92 and extend into junction 86 from opposite sides thereof, as shown in FIG. 1, so as to direct the signal flows either side of junction 86 against the controlled fluid flow from source 88 thereat.

As shown in FIG. 1, piston 18 is of double acting type and the cylinder is closed at one end and a seal is made at the opposite end where piston rod 102 extends from the cylinder. Left passage 90 is connected by conduit 104 to the right end of cylinder 17 and the left end thereof is connected by conduit 106 to right passage 92 so that piston 18 is displaceable in the cylinder according to the proportional pressure of the controlled fluid flow that enters the cylinder on opposite sides of the piston. The axial displacement of piston 18 is converted through motion converting means 20 to angular displacement of the rotor to vary, accordingly, the fluidic signal produced thereby and transmitted to fluid amplifier 22.

OPERATION

In a mechanism wherein it is important that shaft 14 be returned to a pre-selected angular position immediately upon a disturbance therefrom, rotor 44 is fixed to the shaft so that when the shaft is in its pre-selected angular position the rotor is angularly located so that apertures 82 and 84 are each split evenly by the respective end surfaces 73, as shown in FIG. 3, and the piston is centrally located in cylinder 17, as shown in FIG. 1. Thus, the low pressure fluid flow passing from source 55 to sensing device 16 is equally divided between outlets 64 and 66 as equal proportions of the fluid are vented from chambers 48 and 50 to the ambient atmosphere. This produces a balanced signal which is transmitted to fluidic amplifier 22 where equal proportions of the controlled fluid flow from source 88 are applied to opposite sides of piston 18, thereby holding it in its pre-selected angular position.

If shaft 14 should be angularly disturbed by some external force, not shown, so that it is rotated from the pre-selected angular position, a signal proportional to the angular displacement is transmitted to fluidic amplifier 22 by sensing device 16, as explained hereinbefore. At the same time, due to rotation of shaft 14, converting means 20 will effect displacement of piston 18 from its pre-selected angular position, as shown in FIG. 1. If, for example, piston 18 is displaced to the right from the position shown in FIG. 1, this will tend to cause the controlled fluid flow to flow back through conduit 104 into fluidic amplifier 22 and hence into conduit 106 by way of junction 86. As a consequence of the unequal fluidic signals eminating from sensing device 16, fluidic amplifier 22 will direct greater fluidic pressure into conduit 104 than through conduit 106 thereby imposing a force upon piston 18 to influence it back to its pre-selected angular position. This linear displacement of piston 18 is converted by means 20 to rotation of shaft 14 thereby returning the shaft to its pre-selected angular position. As shaft 14 is rotated back to its pre-selected angular position the angular displacement thereof is sensed by sensor 16 which transmits to fluidic amplifier 22 signals reflecting the displacement so that the signals gradually, but rapidly, become balanced as the shaft approaches its preselected angular position. When full recovery of shaft 14 is effected, the signal from sensing device 16 is balanced whereby piston 18 is held in its pre-selected angular position to thereby restrain the shaft thereat. If the angular displacement of shaft 14 is great enough for either aperture 82 or 84 to be completely covered a saturated pressure is applied to the piston 18 in a direction which will effect restoration thereof to the pre-selected angular position.

It will become obvious to persons skilled in the art that forms other than the embodiment shown and described herein are possible within the spirit and scope of the present invention. Therefore, it is desired that the present invention shall not be limited except insofar as it is made necessary by the prior art and by the spirit of the appended claims.

We claim:

1. In a fluid responsive system for quickly effecting recovery of a rotatable shaft which is disposed against axial displacement when said shaft is displaced from a pre-selected angular position, a sensing device for generating a signal proportional to an initial limited angular displacement of said shaft from its pre-selected angular position and for generating a saturated signal responsive to an angular displacement of said shaft greater than the limited angular displacement, said sensing device comprising a housing including a bore defining a circumferential surface, a sleeve including an axial hole fixedly disposed within said bore and a rotor journaled in said hole for rotation responsive to angular displacement of said shaft, a low pressure fluid flow source, said sensing device including a pair of chambers symmetrically disposed in said sleeve for dividing the low pressure fluid flow and defined by segmental slots therewithin and the surrounding circumferential surface of said hole, a passage in said housing conducting the low pressure fluid flow into said sleeve, a pair of similar orifices providing fluid communication between said passage and respective ones of said chambers, means in said sensing device for dividing low pressure fluid flow into two signal flows according to the angular displacement of said shaft from the preselected angular position thereof, a cylinder, a piston disposed for axial displacement in said cylinder, a pressurized controlled fluid flow source, a fluidic amplifier operationally disposed between said sensing device chambers and said cylinder and adapted to receive said controlled fluid flow and the fluid signals from said sensing device, and to divide said controlled fluid flow according to the signals, means for transmitting the divided controlled fluid flow to opposite sides of said piston for a corresponding displacement thereof, and means for converting axial displacement of said piston to angular displacement of said shaft thereby to rotate said shaft back to the pre-selected angular position.

2. The invention as defined in claim 1 wherein said means effecting the fluid signals includes means for varying the said signal flows from said chambers to said fluidic amplifier proportional to the angular displacement of said rotor.

3. The invention as defined in claim 2 wherein said means for varying said signal flows includes a pair of diametrically disposed apertures each providing fluid communication between one of said chambers and said hole, a pair of segmental channels symmetrically disposed in said rotor for fluid communication with respective ones of said apertures, each of said channels including an end edge disposed 180° from the other one thereof and in registry with the respective one of said apertures to proportionally vary the passage of said signal flows from said chambers into said segmental channels responsive to the initial limited displacement of said shaft from the pre-selected angular position, and a segmental opening defined by a chordal cut in said rotor and the surrounding circumferential surface to vent the excessive low pressure fluid flow from said segmental channels.

4. The invention as defined in claim 3 wherein said means for generating a saturated signal comprises means for completely blocking one of said apertures and fully opening the other responsive to continued rotation of said rotor past the limited displacement thereof.

5. The invention as defined in claim 4 wherein said means for blocking one of said apertures and opening the other comprises respectively a surface of said rotor uninterrupted by said segmental channels and one of said segmental channels.

* * * * *